Nov. 6, 1928.  1,690,784
W. HILGERS
MOLDING MACHINE FOR BUTTER, MARGARINE, AND THE LIKE
Filed July 18, 1927
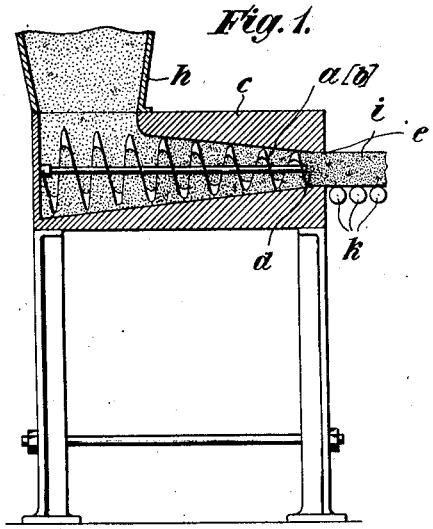
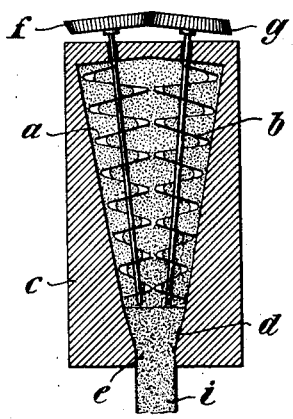
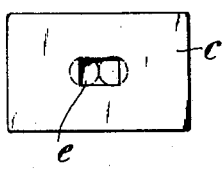
W. Hilgers
INVENTOR
By: Marks & Clerk
Attys.

Patented Nov. 6, 1928.

1,690,784

UNITED STATES PATENT OFFICE.

WILHELM HILGERS, OF DUSSELDORF, GERMANY.

MOLDING MACHINE FOR BUTTER, MARGARINE, AND THE LIKE.

Application filed July 18, 1927. Serial No. 206,666.

Butter, margarine and the like are molded or shaped generally by means of string presses in which the respective material is squeezed through a molding or shaping mouth-piece by means of worms located in a casing and rotated by any suitable means. The material is introduced into said casing counter to the mouth-piece and strongly compressed within the same by the conveying worms in order to attain the solidity required for the purpose. The string leaving the mouth-piece is conducted further by a series of rollers upon which it is shoved forward and then cut into pieces.

In order to compress the material in the desired degree the delivery end of the casing enclosing the conveying worms is, in the known machines, conical, that is to say, there is a conical space between the ends of the worms and the molding or shaping mouth-piece, and the conicalness of said space is very great in order to prevent securely the arising of air holes within the material. On the other hand, the strong pressure to which the material is subjected in said conical space is a cause that the water contained from certain reasons in the butter etc. is squeezed out which is not desired.

A butter etc. molding or shaping machine is lacking which is free from the just mentioned drawback, and the present invention relates to a machine constituting a solution of the problem. I am aware of the fact that endeavours have been made to overcome the drawback mentioned, but without success. All these machines work with cylindrical conveying worms. In my improved machine I make use of conical worms. This machine is illustrated diagrammatically and by way of example on the accompanying drawing on which Figure 1 is a horizontal section through the machine, Figure 2 a vertical longitudinal section therethrough, and Figure 3 a front-view thereof.

The two conical conveying worms $a$ and $b$ are enclosed in a casing $c$, the interior shape of which corresponds to the conicalness of the worms, as shown in Figs. 1 and 2. The diameter of the worms at their thick ends is practically the same as formerly, with respect to the size of the machine and its output, but the diameter at the other end is considerably smaller, and the conicalness of the small space $d$ between these latter ends and the molding or shaping mouth-piece $e$ is the same as that of the main portion of the interior in which the worms are housed. The worms are driven simultaneously by bevel-wheels $f$ and $g$. The butter or margarine or the like introduced into the machine through the hopper $h$ leaves the machine in the form of a string $i$ which is supported on rolls $k$, as usual. Practice has shown that although the butter etc. is compressed in the necessary degree, still, practically no water is squeezed out of it, the effect sought to be attained being, thus, in fact, attained.

I claim:

A machine for molding or shaping butter, margarine, and the like, comprising in combination, two conical worm screws so arranged relatively to one another that their axes converge towards their smaller ends, and said worms screws being spaced from each other and symmetrically arranged, a casing enclosing said worm screws having an interior chamber converging in the direction the worm screws converge, a mouth piece on said casing adjacent to the small end of the chamber, said mouth piece having an extrusion opening of a width and height substantially that of the corresponding dimension of the combined worm screws, and means for rotating the worm screws simultaneously in opposite directions.

In testimony whereof I affix my signature.

WILHELM HILGERS.